United States Patent
Jalali et al.

(10) Patent No.: US 9,712,228 B2
(45) Date of Patent: Jul. 18, 2017

(54) BEAM FORMING AND POINTING IN A NETWORK OF UNMANNED AERIAL VEHICLES (UAVS) FOR BROADBAND ACCESS

(71) Applicant: Ubiqomm LLC, San Diego, CA (US)

(72) Inventors: Ahmad Jalali, San Diego, CA (US); Leonard Schiff, San Diego, CA (US)

(73) Assignee: UBIQOMM LLC, San Diego, CA (US)

( * ) Notice: Subject to any disclaimer, the term of this patent is extended or adjusted under 35 U.S.C. 154(b) by 0 days.

(21) Appl. No.: 14/626,698

(22) Filed: Feb. 19, 2015

(65) Prior Publication Data
US 2016/0134358 A1 May 12, 2016

Related U.S. Application Data

(60) Provisional application No. 62/076,360, filed on Nov. 6, 2014, provisional application No. 62/080,856, filed on Nov. 17, 2014.

(51) Int. Cl.
| | | |
|---|---|---|
| H04B 7/15 | (2006.01) | |
| H04B 7/185 | (2006.01) | |
| H04B 7/204 | (2006.01) | |
| H04B 7/0413 | (2017.01) | |

(52) U.S. Cl.
CPC ....... *H04B 7/18504* (2013.01); *H04B 7/0413* (2013.01); *H04B 7/2041* (2013.01); *B64C 2201/122* (2013.01)

(58) Field of Classification Search
USPC ............ 455/427–431, 7; 370/310–320
See application file for complete search history.

(56) References Cited

U.S. PATENT DOCUMENTS

| | | | |
|---|---|---|---|
| 3,568,197 | A | 3/1971 | Harold |
| 3,780,303 | A | 12/1973 | Smith et al. |
| 3,891,985 | A | 6/1975 | Oigarden et al. |
| 4,209,695 | A | 6/1980 | Arnold et al. |

(Continued)

FOREIGN PATENT DOCUMENTS

| | | |
|---|---|---|
| CA | 2316440 A1 | 2/2001 |
| EP | 2369361 A1 | 9/2011 |

(Continued)

OTHER PUBLICATIONS

Goldsmith AJ., et al., "Design Challenges for Energy-Constrained Ad Hoc Wireless Networks," Wireless Communications, IEEE, 2002, vol. 9 (4), pp. 8-27.

*Primary Examiner* — Fayyaz Alam
(74) *Attorney, Agent, or Firm* — Gazdzinski & Associates, PC.

(57) ABSTRACT

Systems and methods configured to form and point beams from one or more unmanned aerial vehicles (UAVs) toward a target coverage area on the ground. One embodiment describes dividing the target coverage area on the ground among multiple UAVs when each UAV antenna system generates static beams. Another embodiment describes dividing the target coverage area on the ground among multiple UAVs when their antenna systems are capable of dynamically steering their respective beams. Another set of embodiments describe systems and method to allow multiple UAVs to provide service in the same area on the ground using the same spectrum.

20 Claims, 7 Drawing Sheets

(56) References Cited

U.S. PATENT DOCUMENTS

| | | | |
|---|---|---|---|
| 4,278,885 A | 7/1981 | Von et al. |
| 4,317,993 A | 3/1982 | Hertzog, Jr. et al. |
| 4,365,154 A | 12/1982 | Arnold et al. |
| 4,387,302 A | 6/1983 | Givens |
| 4,499,380 A | 2/1985 | Aggour et al. |
| 4,851,687 A | 7/1989 | Ettinger et al. |
| 5,021,664 A | 6/1991 | Hinshaw |
| 5,068,532 A | 11/1991 | Wormald et al. |
| 5,076,993 A | 12/1991 | Sawa et al. |
| 5,098,640 A | 3/1992 | Gozani et al. |
| 5,239,568 A | 8/1993 | Grenier |
| 5,521,817 A | 5/1996 | Burdoin et al. |
| 5,561,434 A | 10/1996 | Yamazaki |
| 5,712,885 A | 1/1998 | Sowerby et al. |
| 5,832,379 A | 11/1998 | Mallinckrodt |
| 6,018,659 A | 1/2000 | Ayyagari et al. |
| 6,034,634 A | 3/2000 | Karlsson et al. |
| 6,044,323 A | 3/2000 | Yee et al. |
| 6,061,562 A * | 5/2000 | Martin | H01Q 3/242 455/427 |
| 6,108,538 A | 8/2000 | Blasiak et al. |
| 6,144,032 A | 11/2000 | Gazdzinski |
| 6,256,476 B1 | 7/2001 | Beamish et al. |
| 6,281,838 B1 | 8/2001 | Hong |
| 6,513,758 B1 | 2/2003 | Lloyd |
| 6,628,941 B2 | 9/2003 | Knoblach et al. |
| 6,718,161 B1 | 4/2004 | Westall et al. |
| 6,756,937 B1 | 6/2004 | Chang et al. |
| 6,856,803 B1 | 2/2005 | Gross et al. |
| 6,873,301 B1 | 3/2005 | Lopez |
| 7,095,376 B1 | 8/2006 | Timothy et al. |
| 7,212,170 B1 | 5/2007 | Dean et al |
| 7,777,674 B1 | 8/2010 | Haddadin et al. |
| 8,078,162 B2 | 12/2011 | Deaton et al. |
| 8,116,763 B1 | 2/2012 | Olsen |
| 8,183,999 B1 | 5/2012 | Giallorenzi et al. |
| 8,190,147 B2 | 5/2012 | Kauffman et al. |
| 8,558,734 B1 | 10/2013 | Piesinger |
| 8,897,770 B1 | 11/2014 | Frolov et al. |
| 9,100,086 B1 | 8/2015 | Olsen |
| 9,119,179 B1 | 8/2015 | Firoiu et al. |
| 2002/0061730 A1 | 5/2002 | Hart et al. |
| 2002/0168974 A1 | 11/2002 | Rosen et al. |
| 2003/0040274 A1 | 2/2003 | Dai et al. |
| 2003/0095067 A1 | 5/2003 | Howell |
| 2003/0223354 A1 | 12/2003 | Olszewski |
| 2004/0038658 A1 | 2/2004 | Gurelli et al. |
| 2004/0152480 A1 | 8/2004 | Willars et al. |
| 2005/0035897 A1 | 2/2005 | Perl et al. |
| 2005/0107077 A1 | 5/2005 | Hintermeier et al. |
| 2005/0108374 A1 | 5/2005 | Pierzga et al. |
| 2005/0143005 A1 * | 6/2005 | Moore, III | H04B 7/18521 455/13.1 |
| 2005/0243005 A1 | 11/2005 | Rafi et al. |
| 2005/0264438 A1 | 12/2005 | Fullerton et al. |
| 2006/0009262 A1 | 1/2006 | Hamm |
| 2006/0063566 A1 | 3/2006 | Maruta |
| 2006/0238411 A1 | 10/2006 | Fullerton et al. |
| 2007/0090990 A1 * | 4/2007 | Nelson | G01S 13/003 342/25 R |
| 2007/0184849 A1 | 8/2007 | Zheng |
| 2007/0224931 A1 | 9/2007 | Fitton et al. |
| 2007/0230419 A1 | 10/2007 | Raman et al. |
| 2008/0090606 A1 | 4/2008 | Hwang et al. |
| 2008/0117858 A1 | 5/2008 | Kauffman |
| 2008/0233865 A1 | 9/2008 | Malarky et al. |
| 2009/0092072 A1 | 4/2009 | Imamura et al. |
| 2009/0209277 A1 | 8/2009 | Pinchas et al. |
| 2009/0219912 A1 | 9/2009 | Wengerter et al. |
| 2009/0295485 A1 * | 12/2009 | Mitchell | H03F 1/0272 330/285 |
| 2010/0085236 A1 | 4/2010 | Franceschini et al. |
| 2010/0172299 A1 | 7/2010 | Fischer et al. |
| 2010/0224732 A1 | 9/2010 | Olson et al. |
| 2010/0273504 A1 | 10/2010 | Bull et al. |
| 2010/0284377 A1 | 11/2010 | Wei et al. |
| 2010/0290412 A1 | 11/2010 | Ahn et al. |
| 2011/0032149 A1 | 2/2011 | Leabman |
| 2011/0103293 A1 | 5/2011 | Gale et al. |
| 2011/0122024 A1 | 5/2011 | Eidloth et al. |
| 2011/0142150 A1 | 6/2011 | Anigstein et al. |
| 2011/0182230 A1 | 7/2011 | Ohm et al. |
| 2011/0286325 A1 | 11/2011 | Jalali et al. |
| 2011/0286372 A1 | 11/2011 | Taghavi et al. |
| 2012/0052828 A1 | 3/2012 | Kamel et al. |
| 2012/0202430 A1 | 8/2012 | Jalali et al. |
| 2012/0235863 A1 | 9/2012 | Erdos et al. |
| 2013/0040655 A1 | 2/2013 | Keidar |
| 2013/0070677 A1 * | 3/2013 | Chang | G01S 13/9303 370/328 |
| 2013/0109299 A1 | 5/2013 | Ross |
| 2013/0155847 A1 | 6/2013 | Li et al. |
| 2013/0156021 A1 | 6/2013 | Ashikhmin et al. |
| 2013/0303080 A1 | 11/2013 | Moreno |
| 2013/0321204 A1 | 12/2013 | Zahavi et al. |
| 2013/0331026 A1 | 12/2013 | O'Neill et al. |
| 2014/0003302 A1 | 1/2014 | Han et al. |
| 2014/0003394 A1 | 1/2014 | Rubin et al. |
| 2014/0049643 A1 | 2/2014 | Segerstrom et al. |
| 2014/0073337 A1 | 3/2014 | Hong et al. |
| 2014/0105054 A1 | 4/2014 | Sägrov et al. |
| 2014/0139372 A1 | 5/2014 | Seol et al. |
| 2014/0241239 A1 * | 8/2014 | Chang | H04B 7/18506 370/316 |
| 2014/0335817 A1 | 11/2014 | Hyde et al. |
| 2014/0347223 A1 | 11/2014 | Hyde et al. |
| 2014/0348140 A1 | 11/2014 | Atkinson |
| 2015/0142966 A1 | 5/2015 | Baran et al. |
| 2015/0236778 A1 | 8/2015 | Jalali |
| 2015/0236779 A1 | 8/2015 | Jalali |
| 2015/0236780 A1 | 8/2015 | Jalali |
| 2015/0236781 A1 | 8/2015 | Jalali |
| 2015/0237569 A1 | 8/2015 | Jalali |
| 2015/0280812 A1 | 10/2015 | Jalali |
| 2015/0304885 A1 | 10/2015 | Jalali |
| 2015/0362917 A1 | 12/2015 | Wang et al. |
| 2016/0013858 A1 | 1/2016 | Jalali et al. |
| 2016/0088498 A1 | 3/2016 | Sharawi |
| 2016/0112116 A1 | 4/2016 | Jalali et al. |
| 2016/0337027 A1 | 11/2016 | Jalali |

FOREIGN PATENT DOCUMENTS

| | | |
|---|---|---|
| EP | 2801838 A1 | 11/2014 |
| WO | WO-2014007873 A2 | 1/2014 |

\* cited by examiner

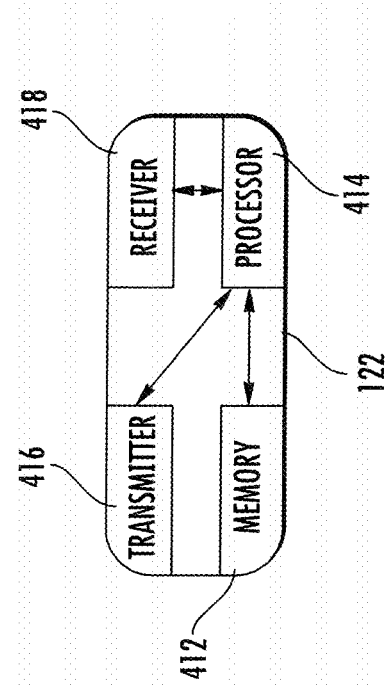
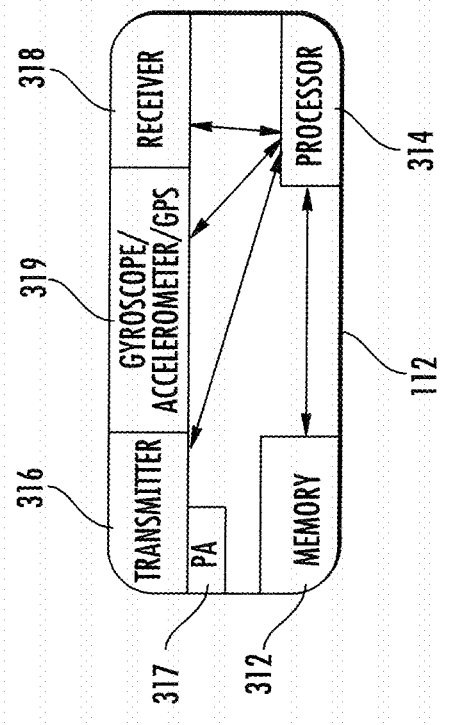

BEAM FORMING AND POINTING IN A NETWORK OF UNMANNED AERIAL VEHICLES (UAVS) FOR BROADBAND ACCESS

PRIORITY AND RELATED APPLICATIONS

This application claims priority to U.S. Provisional Patent Application Ser. No. 62/076,360 filed Nov. 6, 2014, and entitled "BEAM FORMING AND POINTING IN A NETWORK OF UNMANNED AERIAL VEHICLES (UAVS) FOR BROADBAND ACCESS", and U.S. Provisional Patent Application Ser. No. 62/080,856 filed Nov. 17, 2014, and entitled "BEAM FORMING AND POINTING IN A NETWORK OF UNMANNED AERIAL VEHICLES (UAVS) FOR BROADBAND ACCESS", each of which is incorporated herein by reference in its entirety.

The application is related to co-owned, co-pending U.S. patent application Ser. No. 14/516,491 entitled "UNMANNED AERIAL VEHICLE (UAV) BEAM FORMING AND POINTING TOWARD GROUND COVERAGE AREA CELLS FOR BROADBAND ACCESS", filed on Oct. 16, 2014, co-owned, co-pending, U.S. patent application Ser. No. 14/486,916, entitled "ANTENNA MANAGEMENT AND GATEWAY DESIGN FOR BROADBAND ACCESS USING UNMANNED AERIAL VEHICLE (UAV) PLATFORMS", filed Sep. 15, 2014, co-owned, co-pending, U.S. patent application Ser. No. 14/295,160, and entitled "METHODS AND APPARATUS FOR MITIGATING FADING IN A BROADBAND ACCESS SYSTEM USING DRONE/UAV PLATFORMS", filed on Jun. 3, 2014, and co-owned, co-pending U.S. patent application Ser. No. 14/222,497, and entitled "BROADBAND ACCESS TO MOBILE PLATFORMS USING DRONE/UAV", filed on Mar. 21, 2014, each of the foregoing incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure describes aspects of a system for broadband Internet access using unmanned aerial vehicles (UAVs) as a platform to relay Internet traffic among different types of terminals. The disclosure describes systems and methods for optimally pointing the beams of the UAV toward the coverage area on the ground, and adjusting the beams toward the ground coverage area based on the UAV's altitude, UAV movements, and UAV motions such as roll/pitch.

2. Description of Related Technology

As Internet traffic has increased over the years, new technologies are needed to deliver broadband access to homes and enterprises at lower cost and to places that are not yet covered. Examples of current broadband delivery systems include terrestrial wired networks such as DSL (Digital Subscriber Line) on twisted pair, fiber delivery systems such as FiOS (Fiber Optic Service), and geo-stationary satellite systems. The current broadband access systems have a number of shortcomings. One issue is lack of service in remote and lightly populated areas. Geo-stationary satellites do provide service in remote areas of many developed countries. Areas of the world with relatively underdeveloped network infrastructures, however, lack adequate satellite capacity.

A notable reason satellite capacity has not been adequately provided in certain regions of the world is the relatively high cost of satellite systems. Due to adverse atmospheric effects in satellite orbits, satellite hardware must be space qualified and is costly. Launch vehicles to put the satellites in orbit are also costly. Moreover, due to the launch risk and high cost of satellites, there is a significant cost to insure the satellite and the launch. Therefore, broadband satellite systems and services are relatively costly and difficult to justify in those regions. It is also costly to deploy terrestrial systems such as fiber or microwave links in lightly populated regions. The small density of subscribers does not justify the deployment cost.

BRIEF DESCRIPTION OF THE DRAWINGS

In the following figures, similar components are identified using the same reference label. Multiple instances of the same component in a figure are distinguished by inserting a dash after the reference label and adding a second reference label.

FIG. 1B is a graphical depiction of the radio sub-system of the aerial platform of some embodiments.

FIG. 1C is a graphical depiction of the radio sub-system of the ground terminal of the aerial platform based communications system of some embodiments.

DETAILED DESCRIPTION

This disclosure describes aspects of a system designed to provide broadband access. The aerial platforms to which the embodiments of this disclosure apply may be drones, unmanned aerial vehicles (UAVs), balloons, blimps, airships, etc. The drone or UAV may comprise propulsion systems, fuel systems, and onboard navigational and control systems. In one exemplary embodiment the drone comprises a fixed wing fuselage in combination with a propeller, etc. In other embodiments, the UAV comprises a robocopter, propelled by a rotor. The UAV may carry fuel onboard or function using electrical (e.g., battery powered) and/or solar energy. In the remainder of this disclosure, the terms "aerial platform" and "UAV" refer to any of the above mentioned platforms such as drones, balloons, blimps, airships, etc. Conversely, reference to UAVs, drones, balloons, blimps, airships, etc. in the disclosure can refer to aerial platforms in general or any other type of aerial platforms.

Figure 1A:
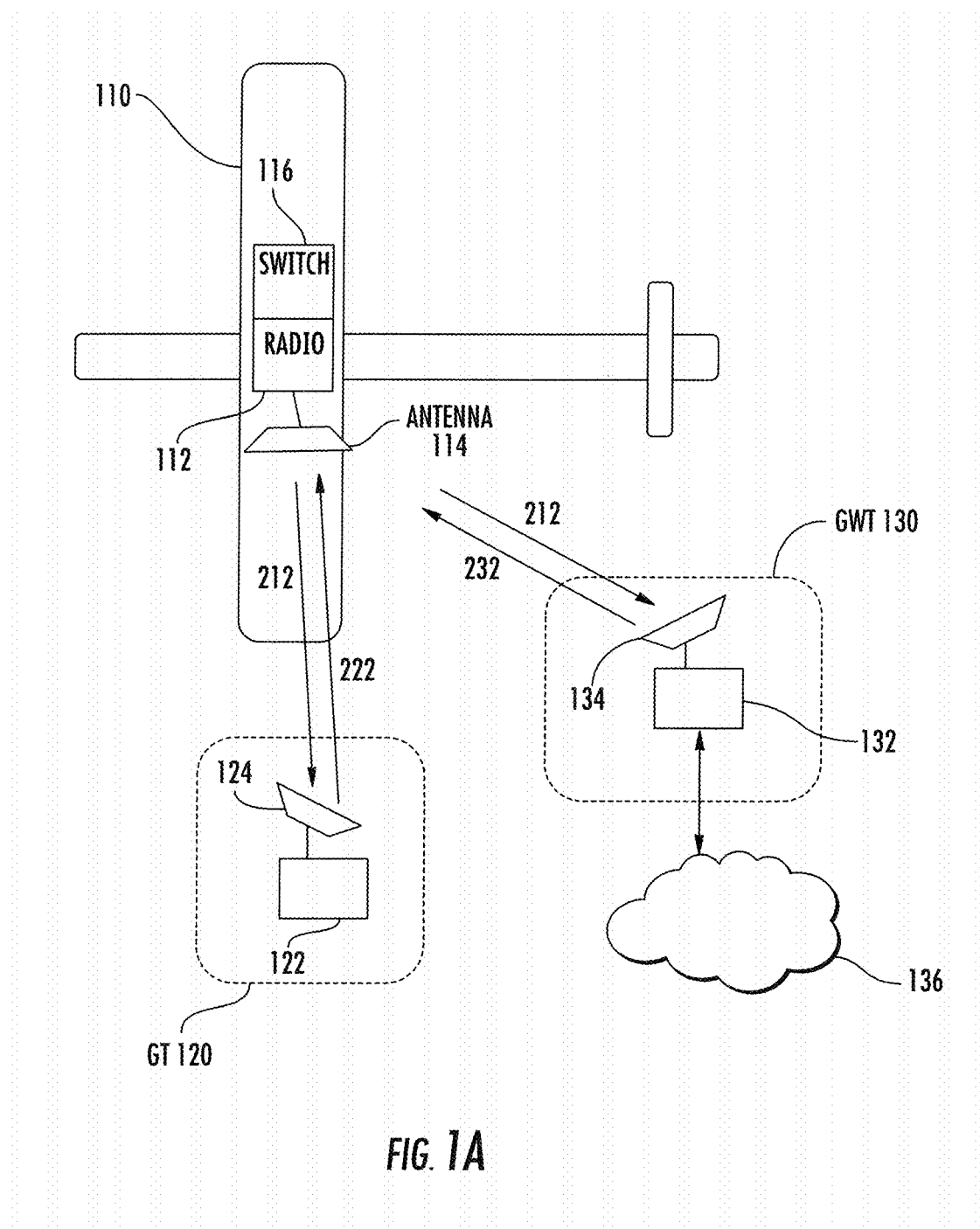
FIG. 1A is a graphical depiction of an aerial platform based communications system of some embodiments.

FIG. 1A shows one UAV 110. Each UAV 110 has a drone radio sub-system 112, a message switch sub-system 116, and at least one drone antenna aperture sub-system 114 that is configured to generate a "beam" or "footprint" of radio coverage.

The exemplary block diagram of the radio sub-system 112 shown in FIG. 1B consists of five sub-systems: (1) a receiver 318 that demodulates and decodes the signal received from antenna sub-system 114; (2) a transmitter sub-system 316 that modulates the data received from a processor 314 and sends the resulting signal to a power amplifier (PA) sub-system 317 and then an antenna sub-system 114; (3) the processor sub-system 314, which carries out functions such as configuring the receiver 318 and transmitter 316 sub-systems, processing the data received from the receiver 318 sub-system, determining the data to be transmitted through the transmitter sub-system 316, as well as controlling the antenna sub-system 114; (4) a memory sub-system 312 that contains program code, configuration data, and system parameter information that are accessed by the processor 314 for execution; and (5) a gyroscope/accelerometer/GPS (Global Positioning System) sub-system 319 to determine the position coordinates and orientation angles such as roll/pitch angles of the UAV 110.

Depending on the altitude of the UAV 110, each UAV 110 covers an area on the ground. Typically, the coverage area may have a radius of as low as a few tens of kilometers and as much as 200 km or more, although those of ordinary skill in the related arts will readily appreciate that smaller and/or greater coverage areas are possible. UAVs 110 communicate with at least two kinds of ground terminals: one type is a user Ground Terminal (GT) 120 (see FIG. 1A), which may include terminals at a home or enterprise that are configured to provide Internet connectivity to the home or enterprise; a second type is an Internet Gateway Terminal (GWT) 130, which communicates with UAV 110 on paths 212 and 232 using a gateway radio sub-system module 132 and an antenna sub-system 134. While the disclosed embodiments are discussed primarily with reference to fixed terminals or devices on the ground, those of ordinary skill in the related arts will readily appreciate that the principles described herein equally apply to terminals or devices attached to mobile platforms such as boats, ships, airplanes, trucks, and/or other mobile platforms/vehicles.

GTs 120 transmits and receives data on paths 222 and 212, respectively, from the Internet 136 using the UAV 110 as an intermediary to the GWT 130. The GWT 130 radio sub-system module 132 may communicate with the Internet 136 by connecting via a local area network (LAN), local area wireless (e.g., Wi-Fi), Bluetooth, cellular, radio, infrared, or any other type of data connection. User devices such as personal computers and mobile devices can connect to the UAV 110 through a number of proxy device(s) in the network between the GT 120 and the user device. In some embodiments, the UAV's 110 radio sub-system aggregates traffic received from at least one GT (up to all GTs) 120 and sends the aggregated data to the Internet 136 via one of the GWTs. In order to support aggregated data streams, the GWTs 130 may need to provide higher data rates from and to the UAVs 100 than the GTs 120, accordingly the gain of the GWT antenna sub-system 134 may be larger than that of the GT 124, and the GWT transmitter may transmit at higher power than the GT's 416 do.

As shown in FIG. 1A, the GT 120 has two main sub-systems, a ground terminal radio sub-system 122, and a ground terminal antenna sub-system 124. As shown in FIG. 1C, the GT radio sub-system 122 consists of 4 sub-systems: (1) a receiver 418 that demodulates and decodes the signal from drone antenna sub-system 114; (2) a transmitter sub-system 416 modulates the data and sends the resulting signal through the antenna sub-system 124; (3) a processor sub-system 414 that carries out functions such as configuring the receiver 418 and transmitter 416 sub-systems, processing the data received from the receiver 418 sub-system, determining the data to be transmitted through the transmitter sub-system 416, as well as controlling the antenna sub-system 124; and (4) a memory sub-system 412 that contains program code, configuration data, and system parameters information that are accessed by the processor 414.

Aerial platforms such as UAVs 110 cruise in a three-dimensional area. The position of the aerial platform 110 with respect to the terminals on the ground changes as the UAV 110 moves around in a circular/elliptical manner in its cruising orbit and also vertically within the "station keeping area" (i.e. the UAV's 110 highest orbit 610 and lowest orbit 612). If adjustments are not made to the beams generated by the UAV 110 based on movements of the UAV 110, then as the UAV 110 moves vertically, the coverage area on the ground that is illuminated by the UAV's antenna sub-system 114 will change.

Figure 2A:
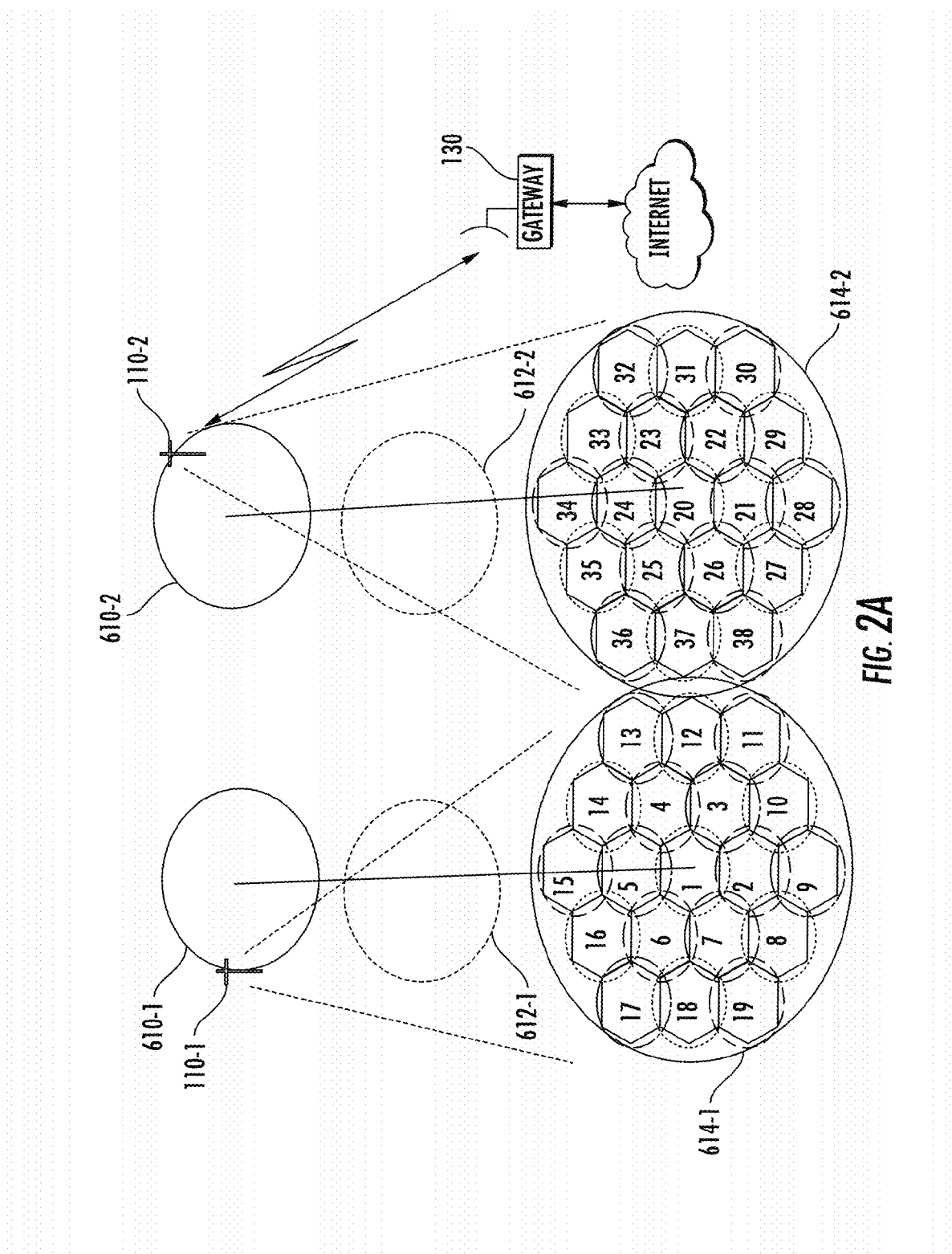
FIG. 2A is a graphical depiction of a set of beams formed by two aerial platforms/UAVs on the ground.

FIG. 2A is an exemplary diagram of the cruising area of a network consisting of two UAVs 110-1 and 110-2. The suffixes 1 and 2 are used to label the same attributes of the different UAVs in FIG. 2A. Top solid circles 610-1 and 610-2 show the cruising orbit of the UAVs 110-1 and 110-2 at their highest possible altitude. The lower dotted circles 612-1 and 612-2 show the cruising orbits at their lowest cruising altitude. Typically, a UAV 110 will cruise around an orbit at a given altitude but at the same time will be slowly moving vertically up or down depending on time of day (so as to e.g., reduce power consumption, etc.). In addition to the vertical movement, the UAV 110 also rolls or pitches as it travels in its cruising orbit.

Various embodiments of the present invention can have different orbital paths 610 of the UAV 110. Path shapes may comprise an elliptical or substantially circular orbit. Other paths 610, 612 include star patterned, clover, flower, FIG. 8, or virtually any possible flight path. Those skilled in the art would also understand the present disclosure contemplates orbital paths that are not just parallel to the ground. Orbits 610, 612 may also include ones that are vertical in nature or encompass three dimensional flight paths. In one set of embodiments, orbits 610, 612 may also be random, or random within certain constraints or spatial boundaries, or include orbits with distinct angular corners (i.e., triangular, quadrilateral, or other multi-sided orbit).

One set of embodiments in this disclosure describes systems and methods to optimize the network of beams formed on the ground by multiple adjacent UAVs 110. Another set of embodiments describe a UAV deployment scheme whereby multiple UAVs 110 may provide coverage to ground terminals 120 in the same coverage area on the same frequency band.

As illustrated in the embodiment FIG. 2A, two UAVs 110-1 and 110-2 and their respective coverage areas 614-1 and 614-2 are divided into cells. The desired target coverage area on the ground is divided into a number of cells, shown as hexagonal cells ranging from 1-19 and 20-38. The UAV 110 forms beams to cover each cell on the ground in its target coverage area 614. FIG. 2A shows an example where UAV 110-1 generates a set of beams 1 through 19 in the target coverage area 614-1, and UAV 110-2 generates a set of beams 20 through 38 in its target coverage area 614-2 on the ground. As illustrated, the hexagons show the ideal coverage of each beam. In reality, the beams overlap as shown by the circles over each hexagonal cell. Frequency reuse (i.e., frequencies allocated to a service that are reused in a regular pattern of areas or cells) of three is used in the example of FIG. 2A. In the illustrated embodiment, the available frequency bandwidth is divided into three bands and the three frequency bands are assigned to adjacent beams in such a way that no two neighboring beams within the coverage area of one UAV 110 use the same frequency band. The three different dotted circle types (dotted, dot-dashed, dashed) indicate beams that use different frequency bands. A frequency reuse of three reduces interference at adjacent beams and improves the data rate. The beams formed by the UAV antenna sub-system 114 are typically designed to have a roll-off of 2 to 3 dB at the cell edge relative to the beam's peak gain at the center of the cell. Other embodiments may be designed to incorporate beams formed with a roll-off of greater or less than 2 to 3 dB from the beam's peak gain. The beams, therefore, cover a larger area than that shown by hexagonal shape cell but at lower gains.

In one embodiment of this disclosure, the UAV 110 and the ground terminal antenna sub-systems 124 are comprised of two antenna polarization such as vertical and horizontal linear polarizations, or left and right circular polarizations. The UAV 110 and ground terminal radio sub-systems 124 also comprise of two transmitter and two receiver chains, each of the transmitters and receivers connected to one of the two antenna polarizations. The UAV 110 and ground terminal radio sub-systems 124 are capable of transmitting and receiving two data streams, one on each of the two antenna polarizations, resulting in a so called 2×2 Multiple Input Multiple Output (MIMO) configuration. Each pair of transmit/receive sub-system of the radio sub-system is referred to as a transceiver in the sequel. The resulting 2×2 MIMO configuration as described above may result in almost doubling the system throughput, using the same amount of spectrum.

In another embodiment of this disclosure, a modified version of IEEE 802.11 air interface protocol, also known generically as Wireless Local Area Network (WLAN) and/or the trademarked name "Wi-Fi", is used by the UAV 110 and ground terminal radio sub-systems 124 as the communications protocol. The UAV 110, as described above, forms a number of beams to cover the target coverage area 614 on the ground. Each of the beams formed by the UAV 110 uses a different transceiver to send and receive data from ground terminals 120 in that beam. The IEEE 802.11 specification uses Carrier Sense Multiple Access/Collision Avoidance (CSMA/CA) protocol as a way to prevent user terminals from interfering with one another when they transmit data over the wireless medium. Embodiments of the present disclosure may use the CSMA/CA framework as described in e.g., IEEE 802.11.

Although CSMA/CA is an effective protocol for handling data transfer collisions over Wi-Fi for LAN where all user terminals are relatively close to the base station, CSMA/CA may be ineffective for handling transmissions in a point-to-multipoint system over long distances such as between UAVs 110 and the ground terminals 120. Using CSMA/CA over long distances in a point-to-multipoint system between the UAV 110 and the ground terminals 120 may be ineffective because ground terminals 120 that are closer to the UAV 110 will dominate the channel arbitration process since they will always be able to sense the channel availability faster than more remote terminals and thus be able to transmit before remote terminals do. This effect is sometimes also referred to as the "near-far" problem. In addition to the near-far problem in CSMA/CA schemes, in Time Division Duplex (TDD) modes (which is specified for use with IEEE 802.11), the two communications links communicate on the same frequency channel but at different times; thus, when radios are deployed in close proximity to one another, radio interference becomes an issue. If the different transmitters are not synchronized and the transceivers are a short distance apart, the received signal from one transmitter may be very strong and could severely degrade the performance for all of the radio receivers at the same location even if adjacent transceivers may be operating in different non-overlapping frequencies and have antennas pointed in different directions. Inside the UAV platform 110, the ground terminal 120 and the gateway transceivers 130 can be placed in close proximity.

In order to solve the CSMA/CA related issues, the radio sub-systems at the ground terminals 120, the gateways 130 and the UAV 110 may run a custom Medium Access Control (MAC) layer on top of the IEEE 802.11 PHY. In one exemplary embodiment, the MAC layer will handle the challenges of transmitting and receiving data frames over the wireless medium. In order to avoid having one set of transmitters at the UAV 110 from interfering with another set of receivers, all transceivers at the UAV 110 must be synchronized so that they transmit almost at the same time and then go into receive mode almost at the same time. In one embodiment to synchronizing the transceivers, a timing signal from a GPS receiver 319 at the UAV 110 is used to provide a common clock to all transceivers and thereby synchronizing the transceivers within the UAV 110. In another embodiment for synchronizing the transceivers, one of the transceivers at the UAV 110 acts as the master and sends its clock timing to the remaining transceivers to which they synchronize their clocks. The clock timing may be sent from the master transceiver to other transceivers physically through wires to other transceivers within the UAV 110; or the master transceiver may send a beacon message that carries the master transceiver's clock timing and the remaining transceivers within the UAV 110 synchronize their clocks to the timing signal in the beacon message.

Once the timing of all transceivers at the UAV 110 corresponding to different UAV beams are synchronized, then a mechanism is needed to solve the near far problem described above. In one embodiment, time is divided into intervals and each time interval is further divided into downlink and uplink sub-intervals. Each sub-interval is further divided into time slots. The first sub-interval in each interval is dedicated to downlink transmissions and is referred to as the downlink sub-interval, where the transceiver at the UAV 110 corresponding to each beam transmits data to the different terminals within their beams. In another embodiment for sending data to ground terminals 120, the transceiver at the UAV 110 communicating with ground terminals in a given beam transmits data to different ground terminals 120 in a round robin manner during the downlink sub-interval. In one embodiment to the UAV 110 allocates time to different ground terminals 120 on the uplink, the ground terminals 120 send their uplink bandwidth requirement to the UAV transceiver during one uplink sub-interval. Then, during the downlink sub-interval following the aforementioned uplink sub-interval, the UAV transmitter corresponding to a beam allocates time on the uplink to each terminal for the next uplink sub-interval. In other words, in one uplink sub-interval the ground terminals 120 send data to the UAV transceiver of their beams based on the time allocated to each terminal 120 in the previous downlink sub-interval, and also send to the UAV transceiver their uplink bandwidth requirement for the next uplink sub-interval. In each uplink sub-interval, certain time slots are allocated to the ground terminals 120 where they send their uplink bandwidth requirement.

To increase the throughput provided in the coverage footprint of a UAV 110, one may increase the amount of frequency spectrum used in each beam, or increase the number of beams used to cover the given foot print. For instance, the coverage area 614-1 as shown in FIG. 2A consists of three rings—the first ring having cell 1, the second ring adding cells 2 through 7 around the first ring (cell 1), and the third ring adding cells 8 through 19 around the second ring—adding one more ring of cells and beams to the beam network of UAV 110-1 will add an additional 18 beams in the fourth ring around the third ring, resulting in a total of 37 beams in coverage area 614-1. A fifth ring of beams would add an additional 24 beams, resulting in a total of 61 beams in the circular footprint. Therefore, the number of rings of cells and beams used to cover the desired footprint of a UAV 110 depends on the required throughput and may be adjusted as desired or needed to effectuate appropriate coverage, consistent with the present disclosure.

Referring back to FIG. 2A, in a UAV static beam forming mechanism (e.g., where the UAV antenna sub-system 114 does not keep each beam pointed at a given location by either mechanical or electronic beam steering as the UAV 110 cruises in its orbit 614), the beams formed by the UAV 110 on the ground will move around within a circle (or other orbit) as the UAV 110 cruises. In this case, the beams shown within circles 614-1 and 614-2 will rotate around the center of the coverage areas as the respective UAV 110 travels in its orbit. As a beam moves over a ground terminal 120 and the neighboring beam provides better coverage to the terminal, the ground terminal will be switched to the beam with better coverage. The advantage of this type of static UAV beam forming is that it reduces UAV antenna sub-system 114 complexity.

In one embodiment of static UAV beam forming, the beams formed by different UAVs 110 may rotate on the ground at different rates because of different movements of the UAVs 110. In other words, with static UAV beam forming, certain beams at the boundary between two different UAVs 110 may end up using the same frequency band. In that case, the throughput at the boundary beams which use the same frequency band may be lower than that of the beams further inside each coverage area. One approach to improving the data rates at the boundary beams that use the same frequencies would be to use the same frequency band in a Time Division Multiplex (TDM) manner between boundary beams of two UAVs 110. For instance, terminals that are at the boundaries of beam 12 of UAV 110-1 and beam 37 of UAV 110-2 may use the same frequency but at different times, where at a given time only one of the UAVs 110 is transmitting to terminals 120 in its coverage area.

In another embodiment, the available frequency spectrum in the same frequency boundary cells is divided into two frequency sub-bands, and each sub-band is assigned to one of the neighboring boundary beams. In other words, in the beams within each coverage area, a first frequency reuse factor could be used (e.g., three (3)), but for cells at certain boundaries, the effective frequency reuse would be doubled (e.g., six (6)). In this manner, the beams at those boundaries can share the available frequency spectrum.

Dividing the spectrum between certain adjacent boundary beams, reduces the throughput in those beams proportionately compared to beams inside the coverage area. Accordingly, in some variants, the UAV radio sub-system 112 allocates more transmit power to the beams with the reduced spectrum as that of other beams to compensate for the lowered throughput due to the division of the available frequency band. The additional transmit power increases the throughput per unit of spectrum bandwidth in the beams with less spectrum. The throughput of beams with larger coverage areas or higher traffic intensity may also be increased by increasing the transmit power in the corresponding beams. In this manner, beam transmit power control is needed to adjust the throughput of the different beams based on the beams' coverage area, traffic requirements, and the amount of spectrum allocation. Moreover, beam transmit power control may also be used to adjust the beam's power in response to rain fade. Therefore, the power amplifier (PA) 317 allocated to a beam will be adjusted over a certain dynamic range based on the abovementioned conditions. The processor sub-system 314 has knowledge of each beam's traffic requirement, allocated frequency, coverage area, and/or atmospheric conditions. Based on the aforementioned information, the processor 314 determines the required power to be allocated to each beam, and instructs the radio sub-system 112 to adjust the power of the PA sub-system 317 for each beam accordingly.

In some embodiments, the dynamic range of the PA 317 is large and the PA output versus input power may have linearity requirements. In such implementations, the power consumption of the PA 317 may be large as the PA 317 must be biased to cover the large dynamic range. In this case, the PA bias will be large resulting in high PA power consumption even when the actual PA transmit power is low. Since a UAVs' 110 available power may be limited, a mechanism for minimizing the power consumption of the PA 317 while allowing PA transmit power control over a wide dynamic range may be required. In one exemplary embodiment, the required dynamic range of the power control is divided into N power sub-ranges to minimize the PA power consumption. The PA 317 is designed to include multiple bias points, where each PA bias point corresponds to one of the N power sub-ranges. Then, when the PA 317 is operating in the j-th power sub-range, the j-th PA bias point corresponding to the j-th power sub-range will be used by the PA 317. In other words, the PA bias is optimized for the specific power sub-range at which the PA 317 is instructed by the power control algorithm to operate. When PA transmit power is at a lower sub-range, the PA bias is also set lower, resulting in a lower PA power consumption than a PA 317 with single but larger bias.

Figure 2B:
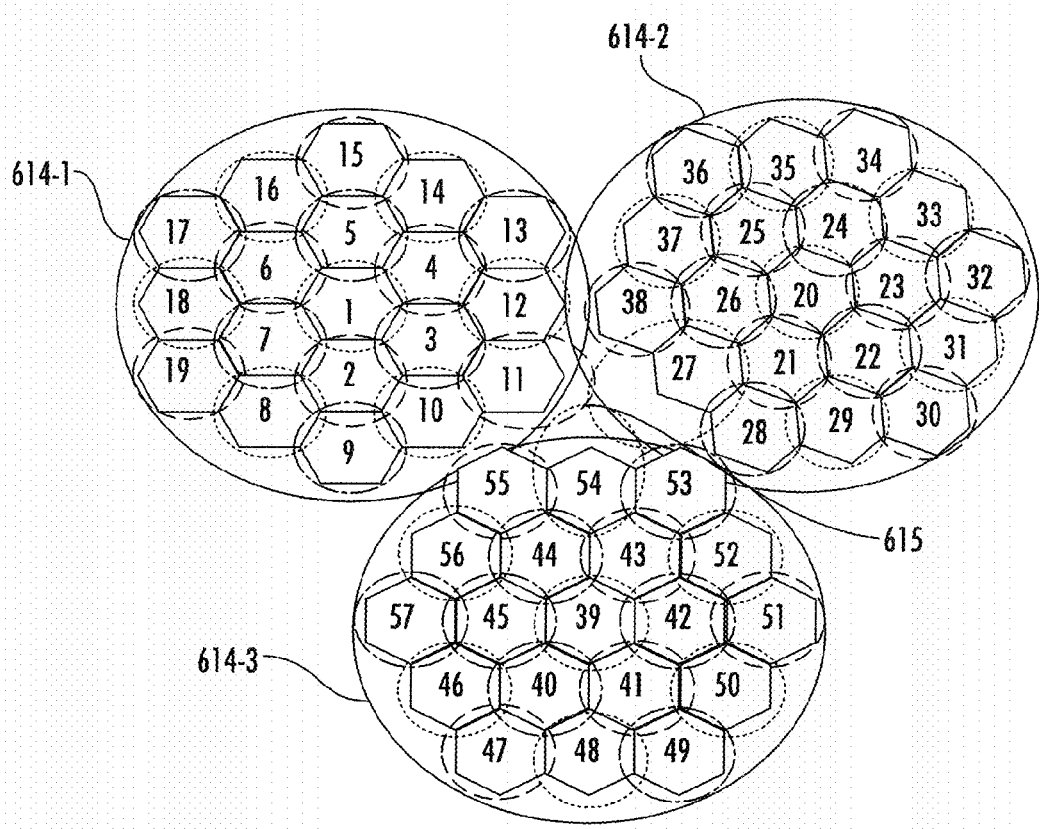
FIG. 2B is a graphical depiction of a set of beams formed according to an embodiment by three aerial platforms/UAVs on the ground.

FIG. 2B illustrates an alternate configuration in which three sets of beams are formed by three adjacent UAVs 110. Under the assumptions that three UAVs 110 may cruise at different speeds, and that UAV antenna static beam forming is employed, then beams at the boundary of coverage areas 614-1, 614-2 and 614-3 may at certain time use the same frequency band as discussed above. As mentioned above, UAV beams are typically designed to roll off by 2 to 3 dB at the cell edge on the ground. Consequently, the UAV beam still provides coverage but at lower gain beyond the cell's edge. More directly, beams formed by the UAV 110 can provide coverage to a larger area than specified by the hexagon boundaries in FIG. 2B, but with lower gain. As can be seen, there are no dedicated beams directly covering the area 615 near where the three coverage areas 614-1, 614-2 and 614-3 intersect. However, as shown, area 615 is adjacent to areas which are covered by beams 27 and 54. As discussed above, some of the boundary beams, such as beams 27 and 54 which use the same frequency band as indicated by the dotted circles over beams 27 and 54, may divide the available frequency between the two beams to reduce co-channel interference and to improve data rate. Since the boundary beams 54 and 27 "bleed" into a larger area and effectively have access to half of the spectrum versus other beams, then as discussed above, the UAVs may increase the power allocated to these beams to improve their throughput and compensate for their smaller frequency spectrum and larger coverage.

Another embodiment of this disclosure describes systems and methods to manage sets of beams between multiple neighboring UAVs 110 when the UAV antenna sub-system 114 has the capability to dynamically steer its beams in response to UAV 110 movements where the beams stay fixed on predetermined ground positions. The dynamic beam forming may be implemented using either mechanical or electronic beam steering mechanisms. The UAV antenna sub-system 114 periodically receives UAV position location coordinates as well as UAV orientation angles from accelerometer/gyroscope/GPS sub-system 319 of the UAV 110. The UAV antenna sub-system 114 then uses the updated UAV position coordinates and orientation angles to steer the beams to remain fixed in their assigned positions on the ground. Thus, the beams stay fixed to their assigned positions even when the UAV 110 moves.

Figure 2C:
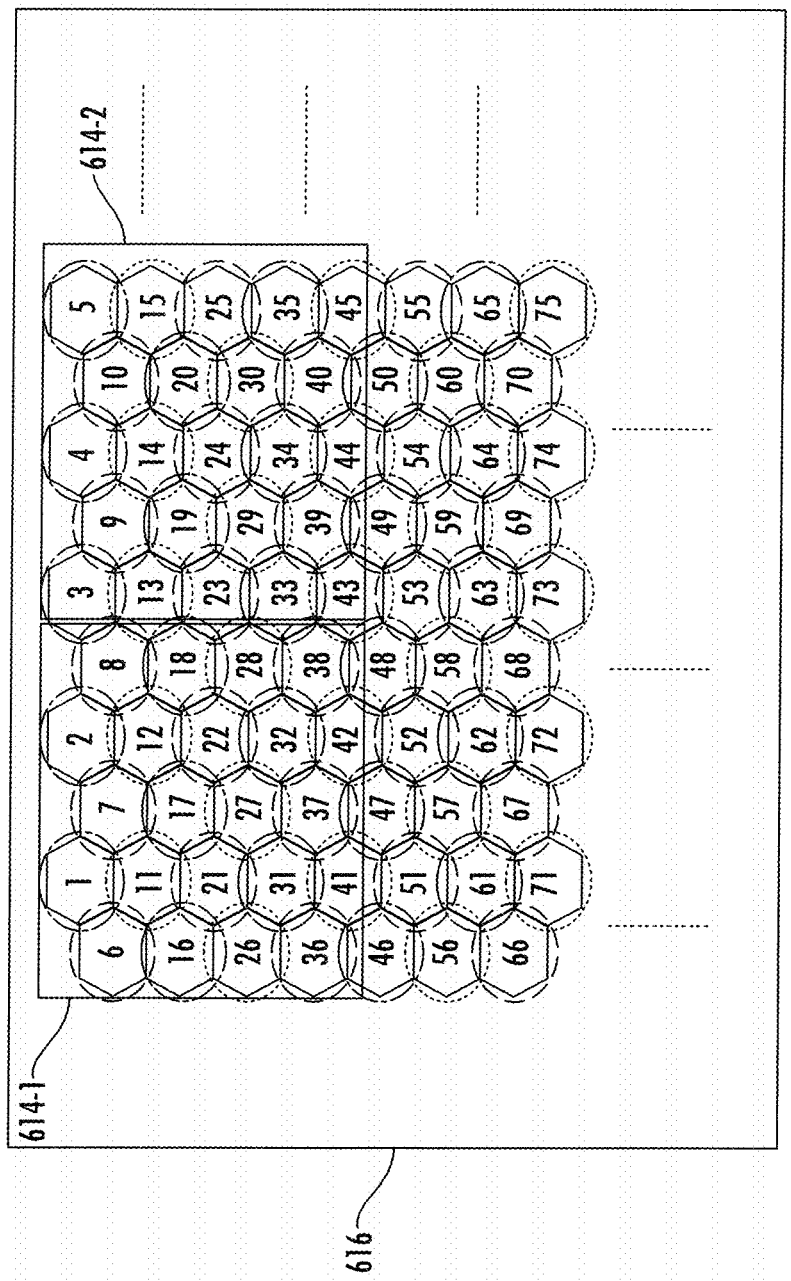
FIG. 2C is a graphical depiction of a set of beams formed according to an embodiment by two aerial platforms/UAVs on the ground.

With dynamic UAV beam steering, the beams covering the different cells remain fixed on those cells and do not substantially move over time. In this case, it is possible to design a frequency reuse scheme among the cells 1-75 on the ground so that even boundary cells and beams corresponding to different UAVs 110 use different frequencies. FIG. 2C illustrates one embodiment in which the cells within coverage area 616 among multiple UAVs 110 are efficiently divided. This is followed by superimposing a frequency reuse, such as reuse of three, on the cells covering the area to be served by multiple UAVs 110. Next, the cells 1-75 are divided between coverage areas of different UAVs 110. FIG. 2C illustrates how part of the ground coverage area is divided into two areas of 614-1 and 614-2, each covered by a different UAV 110. In this example, the coverage area provided by each UAV 110 is approximated by a square. One possible principle in dividing cells between UAVs 110 corresponding to the two areas 614-1 and 614-2 is to assign a cell to a UAV 110 if at least 50% of the cell's area is covered by the corresponding UAV 110. For instance, cells 46, 47 and 48 would not be assigned to coverage area 614-1 because 614-1 covers less than 50% of the aforementioned cells. But cells 41 and 42 are assigned to coverage area 614-1 and are severed by the UAV 110 that provides coverage to 614-1. Cases in which 50% of a cell's area is covered may be resolved through arbitrary, predetermined, or alternating assignment (or time-averaged if not always fixed, as discussed immediately below). Various schemes for dividing coverage areas for different UAVs 110 can be used. The remainder of area 616 may be similarly assigned to other UAVs 110.

In further embodiments other coverage criteria are used to determine cell assignment. For example, in some embodiments a cell will not be assigned to a UAV 110 unless it can cover a supermajority of area (e.g. 75%) up to 100%. In other embodiments, a UAV 110 may be assigned a cell with less coverage (i.e. below 50%). Furthermore, embodiments may also use other criteria rather than just coverage area to determine whether a cell should be assigned to a particular UAV 110 such as the particulars of the UAVs 110 and their configurations, and/or network considerations (e.g., current usage, historic usage, predicted usage, etc.)

In other embodiments, depending on the periodicity of updates of the UAV position and orientation from the accelerometer/gyroscope/GPS sub-system 319 of the UAV 110, the beam positions can stay fixed as described in above embodiments or allowed to move away from their original positions for a length of time. If the UAV coordinates are updated slowly, the beam positions would also be adjusted accordingly. Depending on the connectivity demand associated with the particular ground positions, this configuration may reduce operating costs, e.g., battery life on the UAV 110. Infrastructures or areas with sensitive resource considerations may thereby opt to increase the update periods to reduce upkeep costs.

Figure 3A:
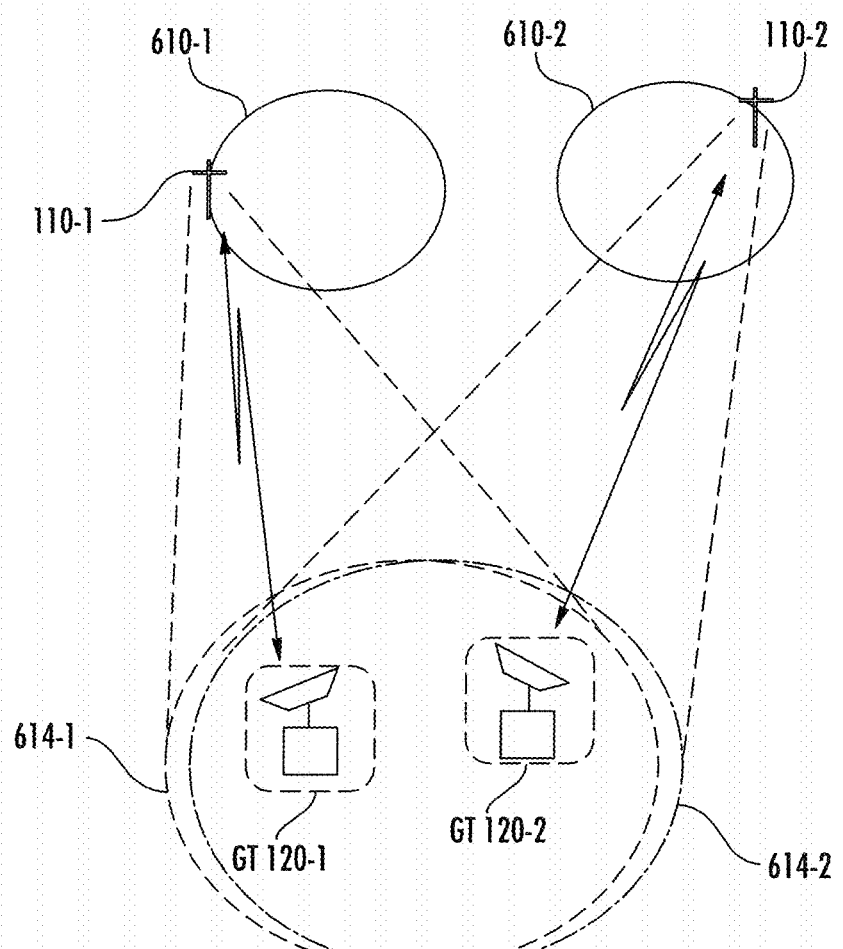
FIG. 3A is a graphical depiction of two UAVs providing coverage to the same area on the same frequency.
Figure 3B:
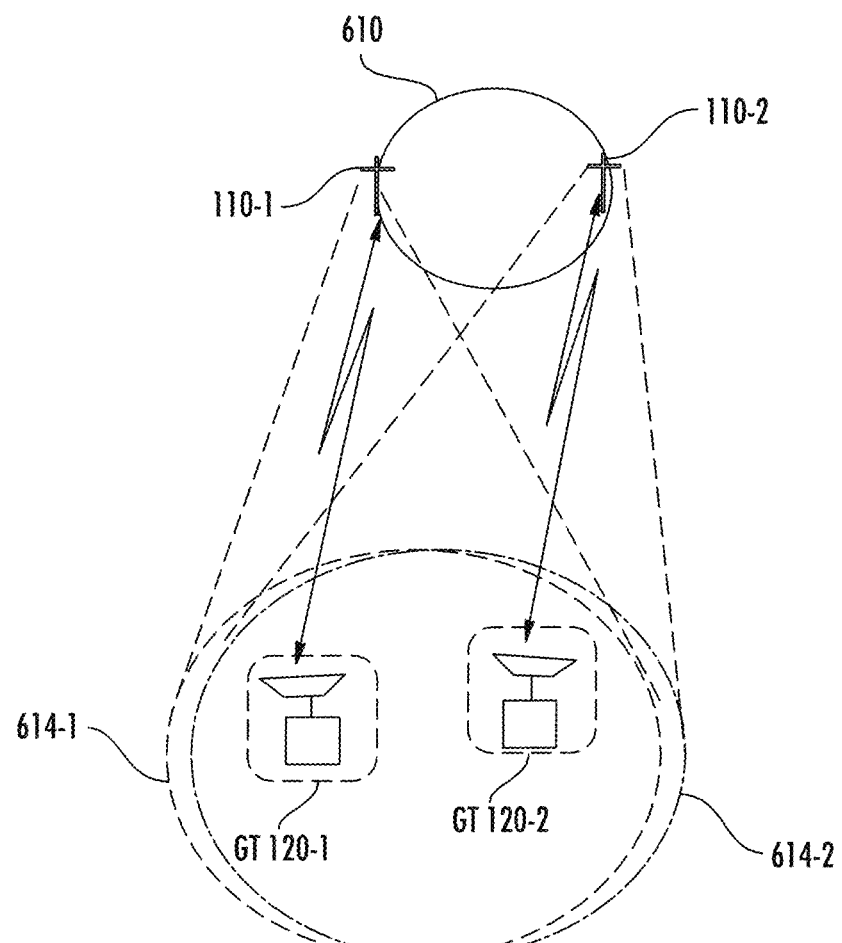
FIG. 3B is a graphical depiction of two UAVs providing coverage to the same area on the same frequency.

Referring now to FIGS. 3A and 3B, a UAV deployment strategy is described whereby multiple UAVs 110 may provide coverage to their respective ground terminals in the same coverage area and on the same frequency band. In an exemplary embodiment of the deployment scheme, two different operators would be allowed to provide broadband service to their respective customers in the same geographic area using the same spectrum. FIG. 3A shows two UAVs 110-1 and 110-2 cruising in orbits 610-1 and 610-2. The coverage areas 614-1 and 614-2 of the two UAVs 110-1 and 110-2 overlap as shown by the two circles with different types of dashed lines. Separation between UAVs 110-1 and 110-2 is achieved by spacing the cruising orbit of the two UAVs 110-1 and 110-2 and also placing the UAVs 110-1 and 110-2 in their respective cruising orbits 610-1 and 610-2 to further increase the separation between the UAVs 110-1 and 110-2.

In contrast to having separate cruising orbits 610-1 and 610-2, UAVs may overlap in their cruising orbits, as depicted in FIG. 3B. Both UAVs 110-1 and 110-2 share a same cruising orbit 610, but the two UAVs 110-1 and 110-2 cruise in such a way so as to maintain a certain separation distance between the two UAVs 110-1 and 110-2. Each UAV 110-1 and 110-2 provides connectivity to a different set of ground terminals 120. FIGS. 3A and 3B show ground terminal 120-1 communicating with UAV 110-1, and ground terminal 120-2 communicating with UAV 110-2. If both UAVs 110-1 and 110-2 use the same frequency band in the same coverage area 614, then ground terminals 120 communicating with a first UAV 110-1 must deploy directional antennas pointed toward the first UAV 110-1 in order to attenuate the interference received from signals transmitted by the second UAV 110-2. Ground terminal 120-1 points its beam toward UAV 110-1. If there is a spatial separation between the two UAVs 110-1 and 110-2, and the antenna beam of the ground terminal 120-1 is chosen to be adequately narrow, then the sidelobe of the ground terminal 120-1 antenna beam will attenuate the signal received from UAV 110-2. The required ground terminal 110-1 antenna sidelobe attenuation toward UAV 110-2 depends on the desired Signal to Interference ratio (S/I) at ground terminal 120-1. The larger the desired S/I, the larger the required attenuation of ground terminal beam sidelobe toward the interfering UAV 110, which in turn requires a narrower beamwidth for the ground terminal antenna beam. The required beamwidth of the ground terminal antenna beam also depends on the spatial separation of the two UAVs 110-1 and 110-2. The closer the two UAVs 110-1 and 110-2 are, the narrower the beamwidth of the ground terminal must be in order to maintain the interference from the interfering UAV 110 below a threshold. Therefore, once the required S/I received at the ground terminal and the minimum separation of the two UAVs 110-1 and 110-2 are specified, then the required beamwidth of the ground terminal beam may be computed for each ground terminal location in the specified coverage area 614. The beamwidth of the ground terminal antenna beam is chosen to be the minimum beamwidth from among all ground terminal locations. In other embodiments, more than two UAVs 110-1 and 110-2 may share the same cruising orbit 610.

Therefore, by adequately separating the distance between the UAVs 110-1 and 110-2 in the cruising orbits 610, by choosing adequately narrow beamwidth ground terminal antenna beam patterns, and by pointing the beam of each ground terminal antenna toward the UAV 110-1 or 110-2 with which it communicates, it is possible for multiple UAVs 110-1 and 110-2 to provide service to ground terminals 120 in the same coverage area and use the same frequency spectrum. This UAV deployment scheme allows reuse of the same spectrum by multiple UAVs 110 in the same geographical area, thereby making efficient use of the available spectrum. Note that the different UAVs 110 serving the same geographic coverage area may belong to different service providers. The different service providers need to agree on the target S/I, and then compute the required UAV separation and ground terminal antenna beamwidth/pattern to achieve the target S/I. The required UAV separation and ground terminal antenna pattern would be specified as rules to be followed by the different UAV service providers to achieve the target S/I performance requirement.

In another configuration, cruising orbits 610-1 and 610-2 of UAVs 110-1 and 110-2 may overlap partially, as long as the UAVs are positioned so as to not cross paths at an intersection of cruising orbits 610-1 and 610-2. The beamwidth for the ground terminal antenna beams may not be required to be as narrow as in the configuration of FIG. 3B because the UAVs 110-1 and 110-2 may be adequately separated. This is particularly true if UAVs 110-1 and 110-2 orbit in a manner that maintains a substantially fixed distance between them (e.g., UAVs 110-1 and 110-2 orbit in the same direction and in parallel). In constant distance variants, the beamwidth of the ground terminal beam will stay relatively constant reducing interference from/to other UAVs 110-1 and 110-2. On the other hand, if the distances between UAVs 110-1 and 110-2 continually varies (e.g., UAVs 110-1 and 110-2 are orbiting at different speeds, and at different angles), then there will be a dynamically changing range of distances between the UAVs 110-1 and 110-2. The UAVs 110-1 and 110-2 must compensate by adjusting their beamwidths based on the varying distances created by uneven orbit paths. Where technological limits or other signal interferences make it difficult to constantly emit beams having narrow beamwidths, or where airspace is restricted to a smaller area than would be needed to completely separate cruising orbits 610-1 and 610-2, a partial overlap of the orbits may provide a compromise.

In some embodiments, when the GTs use adequately narrow beamwidth antennas and the different UAVs, as shown in FIG. 2B, are adequately separated as described in preceding paragraphs, then the ground terminals communicating boundary coverage area cell of one UAV, e.g., cell 11 of UAV 110-1, can receive negligible interference from the neighboring UAVs 110-2 and 110-3 even if the neighboring cells 27 and 54 are using the same frequency as that of cell 11. Consequently, cells at the boundary of coverage areas of multiple UAVs may use the same frequency band with negligible interference to the GTs in those cells and without needing to further divide time or frequency among the boundary cells.

Furthermore, it is contemplated in further embodiments that UAVs 110 may be able to communicate with other UAVs 110 (or sense the presence or position of other UAVs 110) to determine an appropriate distance, velocity, and PA output. It is contemplated that UAVs 110 can change position and/or orbit depending on the position or movements of other UAVs 110. For instance, if one of the UAVs 110 were to go offline, other UAVs 110 can compensate. Additionally, management of a UAV 110 could occur from a terminal on the ground and may be manual or automatic. It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claims herein.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

What is claimed is:

1. An unmanned aerial vehicle (UAV) apparatus configured to form antenna beams toward at least one target coverage region on a ground area, the UAV apparatus comprising:
   an antenna fixture configured to form static beams to cover the at least one target coverage region on the ground area;
   where a same frequency band can be shared with an adjacent beam from another UAV apparatus at different times via a time-division multiplexing (TDM) scheme;
   a plurality of transmitters configured to transmit a first signal to a plurality of ground terminals within the at least one target coverage region on the ground area;
   a plurality of receivers configured to receive a second signal from the plurality of ground terminals;
   a processor; and
   at least one computer program operative to run on the processor, the computer program comprising one or more instructions which are configured to, when executed by the processor, cause the UAV apparatus to:
      form at least one beam on the ground comprising at least one cell;
      where the at least one cell encompasses at least one ground terminal of the plurality of ground terminals; and where the UAV apparatus maintains an orbit above the ground area.

2. The UAV apparatus of claim 1, where:
the at least one target coverage region on the ground area is divided into a plurality of contiguous cells; and
the plurality of contiguous cells is divided into at least two sub-regions, where at least one cell in each of the at least two sub-regions is formed by a beam of a different UAV.

3. The UAV apparatus of claim 2, where a cell at a boundary between the at least two sub-regions is assigned to one of the sub-regions, when the one of the sub-regions covers a majority of the area of the cell at the boundary.

4. The UAV apparatus of claim 1, where each transmitter further comprises a power amplifier, and a transmit power of the power amplifier is adjustable via a power control mechanism.

5. The UAV apparatus of claim 4, where:
a range of the power control mechanism is divided into a plurality of power sub-ranges;
the power amplifier is characterized by a plurality of bias points, each of the plurality of bias points corresponding to a different one of the plurality of power sub-ranges; and
at least one of the plurality of bias points of the power amplifier is set to that of a corresponding one of the plurality of power sub-ranges.

6. The UAV apparatus of claim 1, where the at least one target coverage region comprises a rectangular area.

7. A method of forming antenna beams toward at least one target coverage region on a ground area, the method comprising:
forming at least one static beam to cover the at least one target coverage region on the ground area comprising at least one cell;
where at least one neighboring beam to the at least one static beam is formed by another UAV apparatus;
where the at least one static beam and the at least one neighboring beam share a same frequency band by dividing the same frequency band into one or more sub-bands;
wherein the at least one cell encompasses at least one ground terminal of a plurality of ground terminals; and
transmitting a first signal to the plurality of ground terminals within the at least one target coverage region on the ground area;
receiving a second signal from the plurality of ground terminals; and
maintaining an orbit above the ground area.

8. The method of claim 7,
wherein the at least one target coverage region comprises a circular area.

9. The method of claim 8, further comprising:
forming at least one adjacent beam within the circular area with a different frequency band from the at least static one beam.

10. The method of claim 8, further comprising:
forming at least one adjacent beam within the circular area that shares a same frequency band as the at least one static beam via a time-division multiplexing (TDM) scheme.

11. An unmanned aerial vehicle (UAV) apparatus, the UAV apparatus comprising:
an antenna fixture configured to form one or more beams;
a plurality of transmitters configured to transmit a first signal to a plurality of ground terminals without steering;
wherein the at least one target coverage region comprises an area that corresponds to an orbital path;
a plurality of receivers configured to receive a second signal from the plurality of ground terminals; and
logic configured to form at least one beam on the ground comprising at least one cell;
wherein the at least one cell encompasses at least one ground terminal of the plurality of ground terminals.

12. The UAV apparatus of claim 11, where the at least one target coverage region on the ground area is divided into a plurality of contiguous cells; and
wherein only a portion of the plurality of contiguous cells is formed by the UAV apparatus.

13. The UAV apparatus of claim 12, wherein the plurality of contiguous cells are each assigned a different frequency band.

14. The UAV apparatus of claim 11, wherein the at least one target coverage region corresponds to a circular orbital path.

15. The UAV apparatus of claim 11, wherein the at least one target coverage region corresponds to a rectangular orbital path.

16. The UAV apparatus of claim 11, wherein the plurality of transmitters are configured to transmit the first signal according to a time division multiplexing (TDM) scheme within a frequency band shared with another UAV apparatus.

17. The UAV apparatus of claim 16, wherein the first signal corresponds to a first time slot of the frequency band, and wherein the another UAV apparatus is assigned to a second time slot different than the first time slot.

18. The UAV apparatus of claim 11, wherein the plurality of transmitters are configured to transmit the first signal according to a frequency division multiplexing (FDM) scheme within a frequency band shared with another UAV apparatus.

19. The UAV apparatus of claim 18, wherein the first signal corresponds to a first sub-band of the frequency band, and wherein the another UAV apparatus is assigned to a second sub-band different than the first sub-band.

20. The UAV apparatus of claim 11, further comprising logic configured to handover the at least one ground terminal to another UAV apparatus when the another UAV apparatus can provide better coverage to the at least one ground terminal.

* * * * *

UNITED STATES PATENT AND TRADEMARK OFFICE
CERTIFICATE OF CORRECTION

PATENT NO. : 9,712,228 B2
APPLICATION NO. : 14/626698
DATED : July 18, 2017
INVENTOR(S) : Ahmad Jalali et al.

It is certified that error appears in the above-identified patent and that said Letters Patent is hereby corrected as shown below:

In the Claims

Delete (Claim 9 – Column 13 Line 54):
"9. The method of claim 8, further comprising:
forming at least one adjacent beam within the circular
    area with a different frequency band from the at least
    static one beam."

Insert (Claim 9 – Column 13 Line 54):
--9. The method of claim 8, further comprising:
forming at least one adjacent beam within the circular
    area with a different frequency band from the at least
    one static beam.--

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*